United States Patent
Green

(10) Patent No.: US 11,266,173 B1
(45) Date of Patent: Mar. 8, 2022

(54) FOOD BREADING DEVICE

(71) Applicant: David Green, Miami, FL (US)

(72) Inventor: David Green, Miami, FL (US)

( * ) Notice: Subject to any disclaimer, the term of this patent is extended or adjusted under 35 U.S.C. 154(b) by 11 days.

(21) Appl. No.: 16/902,406

(22) Filed: Jun. 16, 2020

(51) Int. Cl.
| A23P 20/12 | (2016.01) |
| B01F 7/02 | (2006.01) |
| B01F 7/04 | (2006.01) |
| B05C 3/08 | (2006.01) |
| A23G 3/26 | (2006.01) |
| A21C 15/00 | (2006.01) |
| A23L 13/50 | (2016.01) |
| A23L 13/00 | (2016.01) |

(52) U.S. Cl.
CPC ............ *A23P 20/12* (2016.08); *A21C 15/002* (2013.01); *A23G 3/26* (2013.01); *B01F 7/024* (2013.01); *B01F 7/04* (2013.01); *B05C 3/08* (2013.01); *A23L 13/03* (2016.08); *A23L 13/57* (2016.08)

(58) Field of Classification Search
CPC ...... B01J 2/12; B01J 2/14; B01J 2/006; A23P 20/12; A23P 20/13; A23L 13/57; A23L 13/03; B01F 7/00008; B01F 7/00233; B01F 7/00583; B01F 7/00683; B01F 7/00708; B01F 7/00; B01F 7/02; B01F 7/024; B01F 7/04; B01F 2215/0014; B01F 15/0227; A23B 4/10; B05C 3/08; B05C 19/06; A61J 3/005; A21C 9/04; A21C 15/002; A47J 37/047; A23N 17/007; A23G 3/02; A23G 3/26
USPC ..................... 118/13, 19, 417, 418; 99/494; 366/169.1, 169.2
See application file for complete search history.

(56) References Cited

U.S. PATENT DOCUMENTS

| 913,399 | A | * | 2/1909 | Kilpatrick |
| 3,648,648 | A | | 3/1972 | Johnson |
| 3,696,778 | A | * | 10/1972 | Moore .................... A22C 21/00 |
| | | | | 118/699 |
| 3,855,965 | A | | 12/1974 | Gordon |
| 4,168,674 | A | * | 9/1979 | Futter ....................... A23G 3/26 |
| | | | | 118/695 |
| 5,134,956 | A | | 8/1992 | Stewart |
| 5,238,493 | A | | 8/1993 | Miller |
| 7,229,656 | B2 | | 6/2007 | Paumen |
| 8,001,920 | B2 | | 8/2011 | King |
| 8,323,711 | B2 | * | 12/2012 | Brandt, Jr. ............... A23G 7/02 |
| | | | | 426/302 |
| D749,358 | S | | 2/2016 | Hyp |

(Continued)

FOREIGN PATENT DOCUMENTS

WO      2003022073      3/2003

*Primary Examiner* — Laura Edwards
(74) *Attorney, Agent, or Firm* — Kyle A. Fletcher, Esq.

(57) ABSTRACT

The food breading device is configured for use with a target foodstuff and a coating foodstuff. The coating foodstuff has a bulk solid phase. The food breading device coats the coating foodstuff on the target foodstuff. The food breading device includes a containment shell, a paddle structure, and a timing device. The timing device attaches to the containment shell. The paddle structure mounts in the containment shell. The target foodstuff is placed inside the containment shell. The paddle structure is a rotating structure. The paddle structure rotates such that the paddle structure changes the position of the target foodstuff within the containment shell. The rotation of the paddle structure further releases the coating foodstuff onto the target foodstuff.

17 Claims, 5 Drawing Sheets

(56) References Cited

U.S. PATENT DOCUMENTS

2005/0081722 A1  4/2005 Gucciardi
2007/0196547 A1* 9/2007 King et al.

* cited by examiner

FOOD BREADING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of food and foodstuffs including the working of foodstuffs, more specifically, an apparatus for applying particles and powders to foodstuffs. (A23P20/13)

SUMMARY OF INVENTION

The food breading device is a mechanical device. The food breading device is configured for use with a target foodstuff and a coating foodstuff. The coating foodstuff has a bulk solid phase. The food breading device coats the coating foodstuff on the target foodstuff. The food breading device comprises a containment shell, a paddle structure, and a timing device. The timing device attaches to the containment shell. The paddle structure mounts in the containment shell. The target foodstuff is placed inside the containment shell. The paddle structure is a rotating structure. The paddle structure rotates such that the paddle structure changes the position of the target foodstuff within the containment shell. The rotation of the paddle structure further releases the coating foodstuff onto the target foodstuff. The timing device is a countdown timer that generates an alarm after a previously determined amount of time has elapsed.

These together with additional objects, features and advantages of the food breading device will be readily apparent to those of ordinary skill in the art upon reading the following detailed description of the presently preferred, but nonetheless illustrative, embodiments when taken in conjunction with the accompanying drawings.

In this respect, before explaining the current embodiments of the food breading device in detail, it is to be understood that the food breading device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the food breading device.

It is therefore important that the claims be regarded as including such equivalent construction insofar as they do not depart from the spirit and scope of the food breading device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
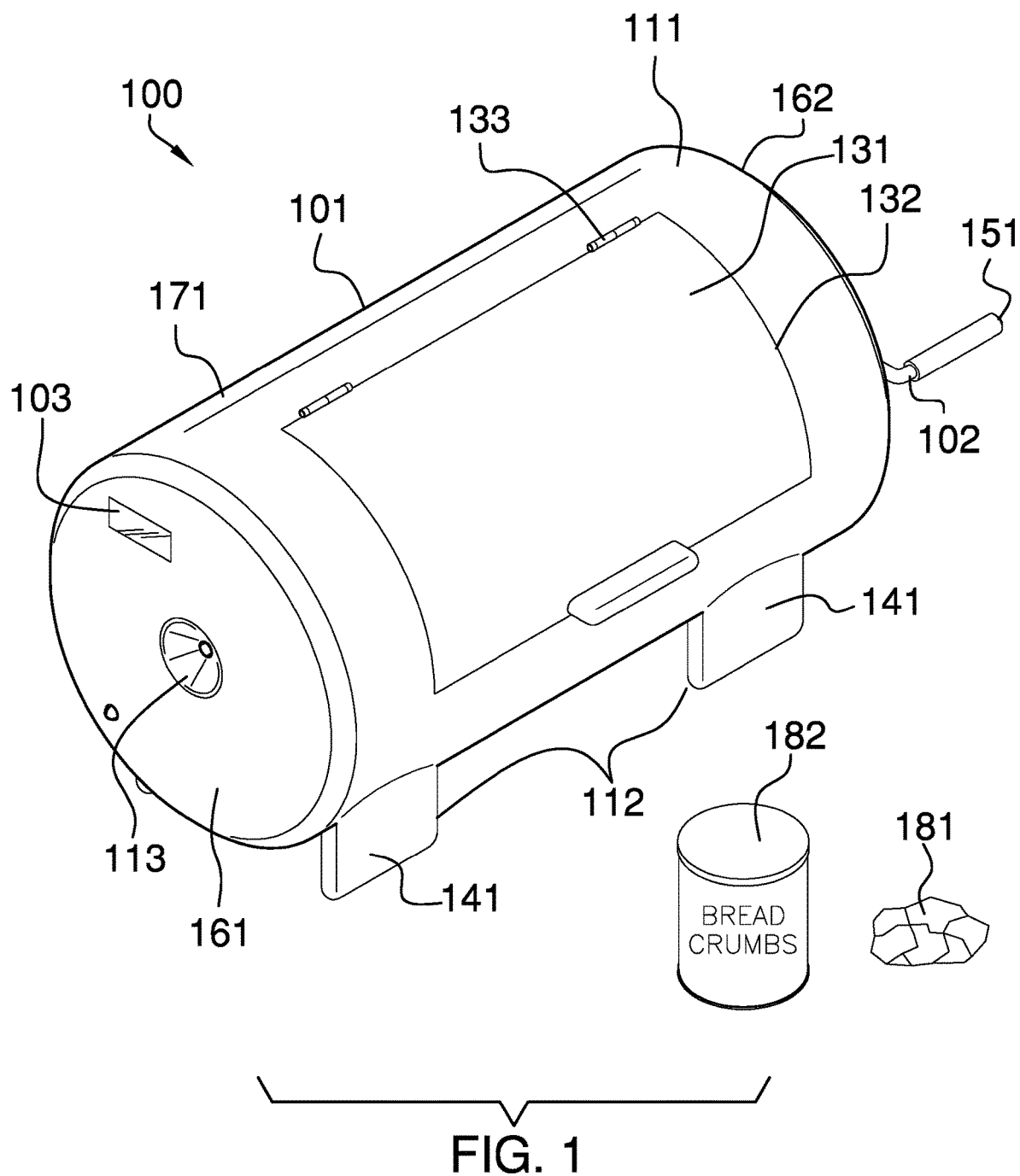
FIG. 1 is a perspective view of an embodiment of the disclosure.
Figure 2:
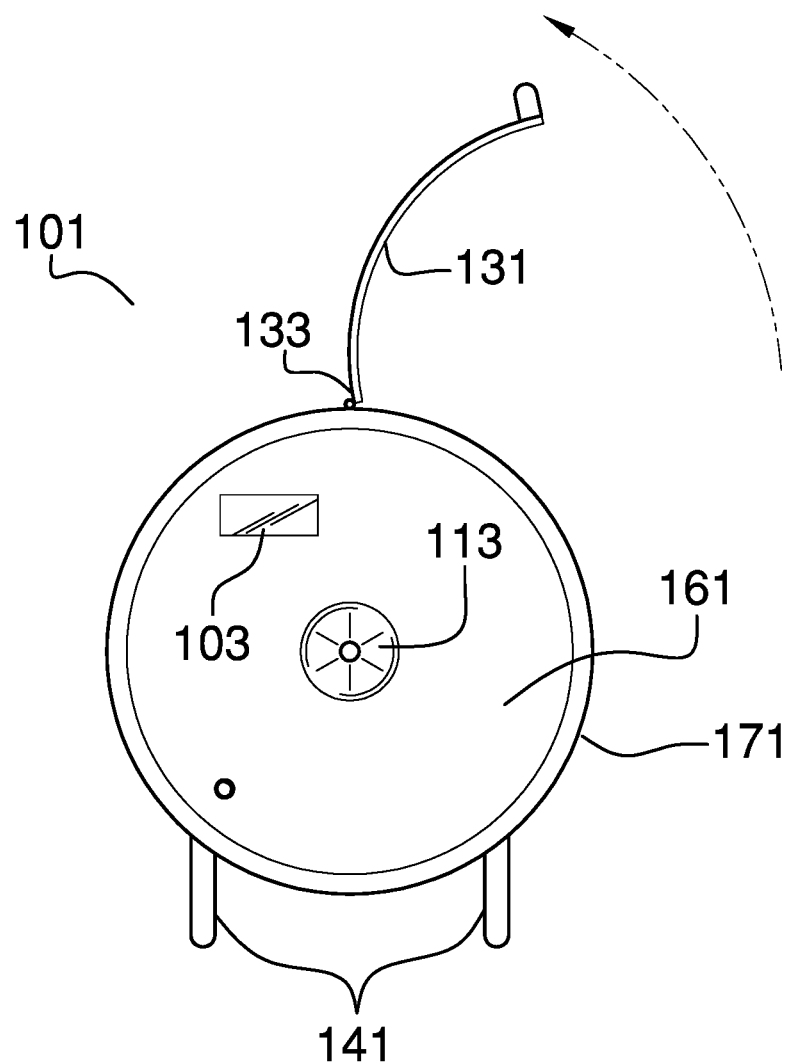
FIG. 2 is a side view of an embodiment of the disclosure.
Figure 3:
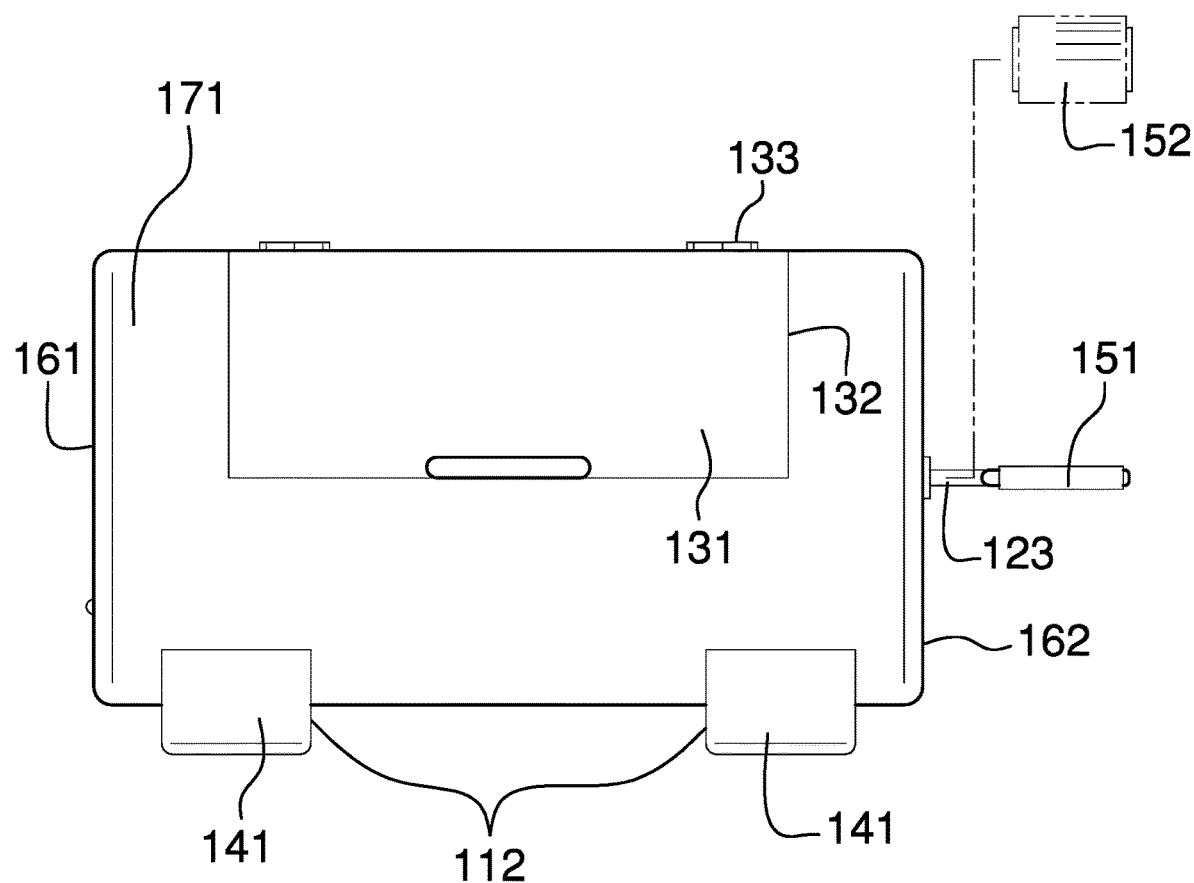
FIG. 3 is a front view of an embodiment of the disclosure.
Figure 4:
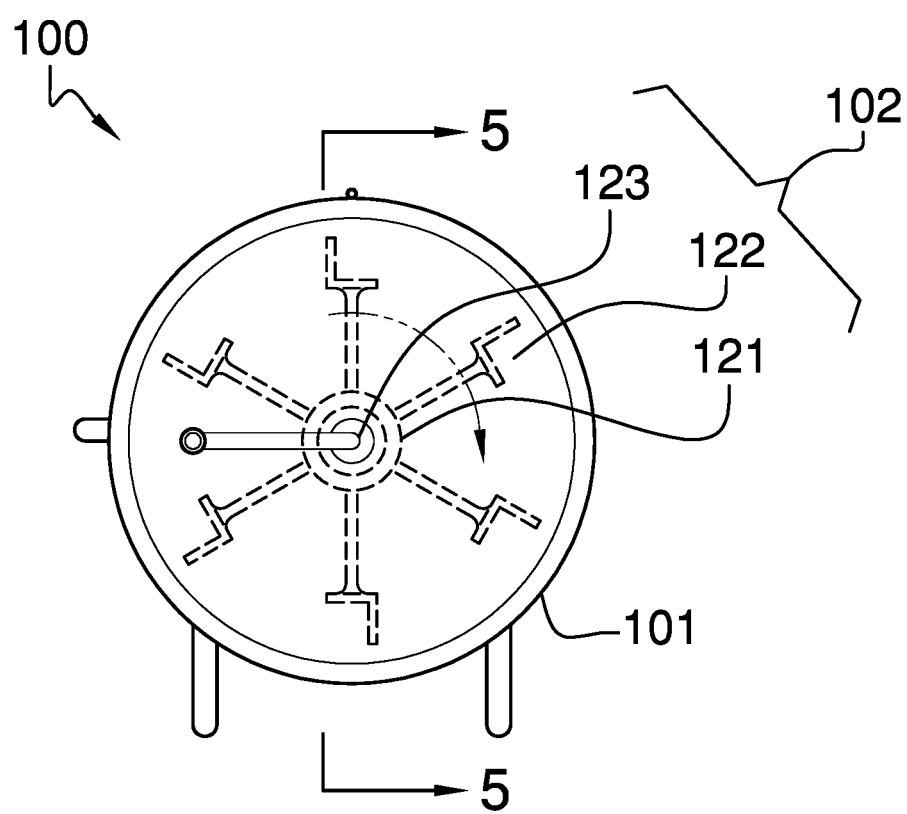
FIG. 4 is a reverse side view of an embodiment of the disclosure.
Figure 5:
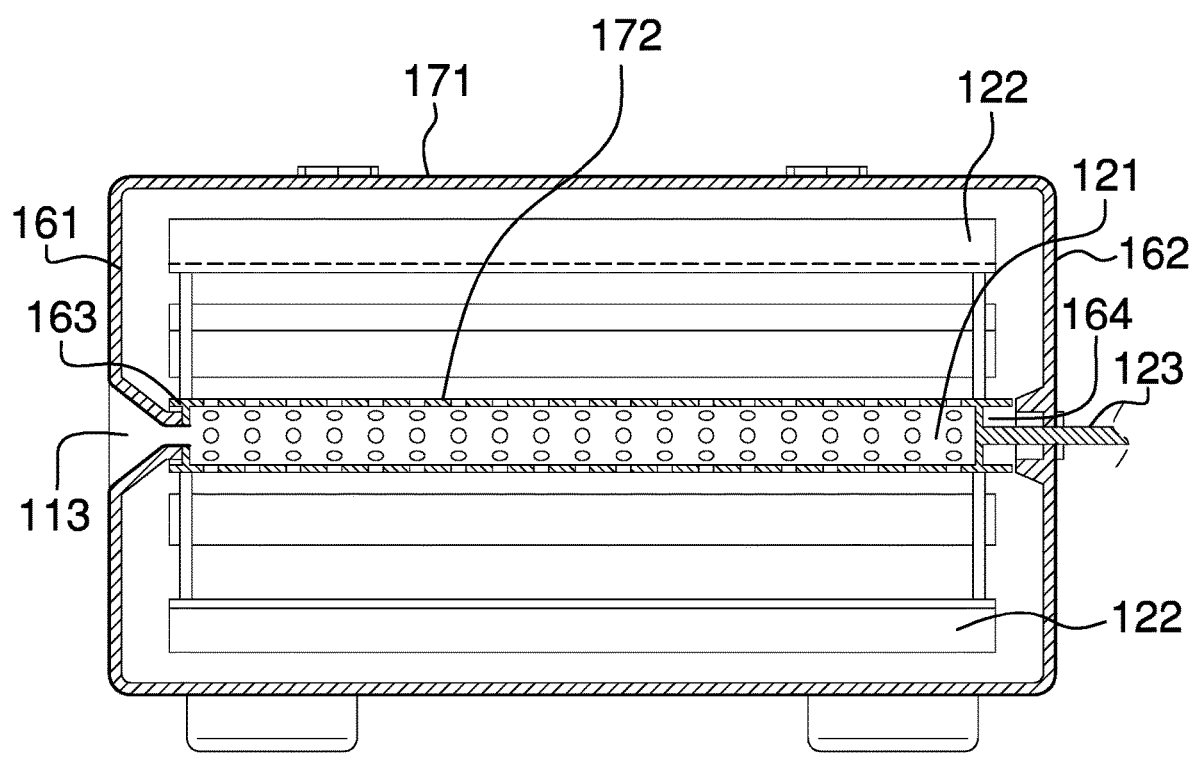
FIG. 5 is a cross-sectional view of an embodiment of the disclosure across 5-5 as shown in FIG. 4.

Detailed reference will now be made to one or more potential embodiments of the disclosure, which are illustrated in FIGS. 1 through 5.

Detailed reference will now be made to one or more potential embodiments of the disclosure, which are illustrated in FIGS. 1 through 5.

The food breading device is a mechanical device. The invention 100 is configured for use with a target foodstuff 181 and a coating foodstuff 182. The coating foodstuff 182 has a bulk solid phase. The invention 100 coats the coating foodstuff 182 on the target foodstuff 181. The invention 100 comprises a containment shell 101, a paddle structure 102, and a timing device 103. The timing device 103 attaches to the containment shell 101. The paddle structure 102 mounts in the containment shell 101. The target foodstuff 181 is placed inside the containment shell 101. The paddle structure 102 is a rotating structure. The paddle structure 102 rotates such that the paddle structure 102 changes the position of the target foodstuff 181 within the containment shell 101. The rotation of the paddle structure 102 further releases the coating foodstuff 182 onto the target foodstuff 181. The timing device 103 is a countdown timer that generates an alarm after a previously determined amount of time has elapsed.

The containment shell 101 is a prism-shaped structure. The containment shell 101 is a hollow structure. The containment shell 101 has a semi-enclosed prism shape. The containment shell 101 contains the target foodstuff 181 in anticipation of the coating process. The containment shell 101 comprises a prism structure 111, a pedestal structure 112, and a funnel 113.

The prism structure 111 is a prism-shaped structure. The prism structure 111 is a hollow structure. The prism structure 111 has a semi-enclosed prism shape. The prism structure 111 forms the primary shape of the containment shell 101. The prism structure 111 forms the exterior surfaces of the containment shell 101. The prism structure 111 forms the containment structure that stores the target foodstuff 181. The paddle structure 102 mounts within the interior of the prism structure 111.

The prism structure 111 further comprises a first congruent end 161, a second congruent end 162, and a first lateral face 171. The first congruent end 161 is a congruent end of the prism-shaped structure formed by the prism structure 111. The second congruent end 162 is a congruent end of the prism-shaped structure formed by the prism structure 111. The second congruent end 162 is the congruent end of the prism structure 111 that is distal from the first congruent end 161. The first lateral face 171 is the lateral face of the prism-shaped structure of the prism structure 111. The prism structure 111 further comprises a door 131 and a door 131 aperture 132.

The door 131 aperture 132 is an aperture formed through the first lateral face 171 that forms the semi-enclosed prism structure of the prism structure 111. The door 131 aperture 132 forms the port that provides access to the hollow interior of the prism structure 111.

The door 131 is an access barrier that provides access into the interior containment space formed by the prism structure 111. The door 131 is a rotating structure. The door 131 rotates between a closed position and an open position. The door 131 controls access into the interior containment space of the prism structure 111. The door 131 has a non-Euclidean disk structure. The curvature of the non-Euclidean disk structure of the door 131 is selected such that the door 131 sits flush on the exterior surface of the first lateral face 171 of the prism structure 111. The door 131 is geometrically similar to the door 131 aperture 132. The span of the length of the perimeter of the door 131 is greater than the span of the length of the perimeter of the door 131 aperture 132 such that the door 131 encloses the door 131 aperture 132.

The door 131 further comprises a hinge structure 133. The hinge structure 133 is a fastening structure. The hinge structure 133 attaches the door 131 to the first lateral face of the prism structure 111 such that the door 131 encloses the door 131 aperture 132. The hinge structure 133 attaches the door 131 to the prism structure 111 such that the door 131 rotates relative to the first lateral face 171 of the prism structure 111.

The pedestal structure 112 is a mechanical structure. The pedestal structure 112 forms a load path that transfers the load of the invention 100 to a supporting surface. The pedestal structure 112 elevates the prism structure 111 above the supporting surface. The pedestal structure 112 mounts on the exterior surface of the prism structure 111. In the first potential embodiment of the disclosure, the pedestal structure 112 comprises a plurality of footings 141.

Each of the plurality of footings 141 is a disk structure. Each of the plurality of footings 141 forms a portion of a load path that transfers the load of the invention 100 to the supporting surface. Each of the plurality of footings 141 attaches to the first lateral face 171 of the prism structure 111 to forms an offset lateral prism structure. The plurality of footings 141 combine to form the pedestal structure 112 that elevates the prism structure 111 above the supporting surface.

The funnel 113 is a mechanical structure. The funnel 113 has a hollow pyramid shape. The funnel 113 is formed as a truncated pyramid. The funnel 113 mounts in the first congruent end 161 of the prism structure 111. The funnel 113 transports the coating foodstuff 182 from the exterior of the prism structure 111 into the paddle structure 102 for subsequent distribution onto the target foodstuff 181. The funnel 113 is defined elsewhere in this disclosure.

The paddle structure 102 is a mechanical structure. The paddle structure 102 is a rotating structure. The paddle structure 102 has the primary shape of a prism-shaped structure. The paddle structure 102 is a hollow structure. The paddle structure 102 mounts in the containment shell 101 to form a composite prism structure. The paddle structure 102 mounts in the containment shell 101 such that the paddle structure 102 rotates within the containment shell 101. The axis of rotation of the paddle structure 102 aligns with the center axis of the prism structure formed by the mounting of the paddle structure 102 in the containment shell 101. The rotation of the paddle structure 102 moves the target foodstuff 181 within the containment shell 101 during the coating process. The paddle structure 102 further distributes the coating foodstuff 182 onto the target foodstuff 181 during the coating process. The paddle structure 102 comprises a foraminous tube 121, a plurality of radial hooks 122, and a drive shaft 123.

The foraminous tube 121 is a prism-shaped structure. The foraminous tube 121 is a hollow structure. The foraminous tube is a foraminous structure. The foraminous tube 121 has a capped tube structure. The plurality of radial hooks 122 attach to the foraminous tube 121. The drive shaft 123 attaches to the foraminous tube 121 such that the foraminous tube 121 and the drive shaft 123 form a composite prism structure. The foraminous tube 121 attaches to the first congruent end 161 and the second congruent end 162 of the prism structure 111 such that the foraminous tube 121 rotates freely within the prism structure 111. The foraminous tube 121 comprises a third congruent end 163, a fourth congruent end 164, and a second lateral face 172.

The third congruent end 163 is the open end of the capped tube structure of the foraminous tube 121. The third congruent end 163 forms a fluidic connection with the funnel 113 of the prism structure 111 such that the target foodstuff 181 flows into the foraminous tube 121 through the third congruent end 163. The third congruent end 163 attaches to the first congruent end 161 of the prism structure 111 such that the foraminous tube 121 rotates freely within the prism structure 111.

The fourth congruent end 164 is the closed end of the capped tube structure of the foraminous tube 121. The fourth congruent end 164 is the congruent end of the foraminous tube that is distal from the third congruent end 163. The fourth congruent end 164 attaches to the second congruent end 162 of the prism structure 111 such that the foraminous tube 121 rotates freely within the prism structure 111. The drive shaft 123 inserts through the fourth congruent end 164 of the prism structure 111. The fourth congruent end 164 attaches to the second congruent end 162 of the prism structure 111 such that the foraminous tube 121 rotates freely within the prism structure 111.

The second lateral face 172 is the lateral face of the prism structure of the foraminous tube 121. The second lateral face 172 is a foraminous structure. The coating foodstuff 182 falls through the foraminous structure of the second lateral face 172 of the foraminous tube 121 to coat the target foodstuff 181

Each of the plurality of radial hooks 122 is a mixing structure. Each of the plurality of radial hooks 122 attaches to the foraminous tube 121 such that the rotation of the foraminous tube 121 rotates the plurality of radial hooks 122 through the target foodstuff 181. The mixing structure of each of the plurality of radial hooks 122 pushes the target foodstuff 181 to a different position within the prism structure 111 as the plurality of radial hooks 122 rotates within the prism structure 111.

Each of the plurality of radial hooks 122 comprises a prism-shaped shaft and a hook structure. The prism-shaped structure is an extension structure that extends the reach between the center axis of the foraminous tube 121 and the hook structure. The prism-shaped shaft of each of the plurality of radial hooks 122 projects radially away from the center axis of the foraminous tube 121. The span of the length of the center axis of the prism-shaped shaft of each of the plurality of radial hooks 122 is selected such that the hook structure of each selected radial hook passes through the target foodstuff 181.

The drive shaft 123 is a prism-shaped structure. The drive shaft 123 attaches to the fourth congruent end 164 of the capped tube structure of the foraminous tube 121 to form a composite prism structure. The drive shaft 123 is a rotating structure. The drive shaft 123 rotates around a center of rotation that aligns with the composite prism structure formed by the foraminous tube 121 and the drive shaft 123. The rotation of the drive shaft 123 physically rotates the foraminous tube 121 and the plurality of radial hooks 122 to move the target foodstuff 181 within the prism structure 111.

The timing device 103 is an apparatus. The timing device 103 is a countdown timing device. The 103 mounts on the first congruent end 161 of the prism structure 111. The timing device 103 indicates when the paddle structure 102 should stop rotating within the containment shell 101.

In the first potential embodiment of the disclosure, the drive shaft 123 is manually driven. The drive shaft 123 is a handle 151. The handle 151 is a crank. The handle 151 attaches to the end of the congruent end of the prism structure of the drive shaft 123 that is distal from the paddle structure 102. The handle 151 forms a grip that can be manually rotated around the axis of rotation of the drive shaft 123 such that the rotation of the drive shaft 123 rotates the foraminous tube 121 and the plurality of radial hooks 122 within the prism structure 111. In the first potential embodiment of the disclosure, the timing device 103 generates an audible alarm indicating that the paddle structure 102 should no longer continue rotating within the containment shell 101.

In the second potential embodiment of the disclosure, the drive shaft 123 is mechanically driven. The drive shaft 123 is an electric motor 152. The electric motor 152 is an electric device. The electric motor 152 converts electrical energy into rotational mechanical energy. The electric motor 152 attaches to the end of the congruent end of the prism structure of the drive shaft 123 that is distal from the paddle structure 102. The electric motor 152 attaches to the end of the congruent end of the prism structure of the drive shaft 123 such that the axis of rotation of the electric motor 152 aligns with the axis of rotation of the drive shaft 123. The electric motor 152 rotates the drive shaft 123 such that the rotation of the drive shaft 123 rotates the foraminous tube 121 and the plurality of radial hooks 122 within the prism structure 111. In the second potential embodiment of the disclosure, the timing device 103 generates an electric signal that discontinues the operation of the electric motor 152.

The following definitions were used in this disclosure:

Alarm: As used in this disclosure, an alarm refers to a signal used to indicate the occurrence of an event.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Closed Position: As used in this disclosure, a closed position refers to a movable barrier structure that is in an orientation that prevents passage through a port or an aperture. The closed position is often referred to as an object being "closed."

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Countdown: As used in this disclosure, a countdown refers to the announcement, display, or presentation of numerical information in descending order.

Crank: As used in this disclosure, a crank is a handle or an arm that is attached perpendicularly to the axis of rotation of a shaft and that is used for transmitting rotary motion to the shaft.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Door: As used in this disclosure, a door is a movable or removable barrier that is attached to the wall of a room or the surface of a container for the purpose of allowing or preventing access through an aperture into the room or container.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Flush: As used in this disclosure, the term flush is used to describe the alignment of a first surface and a second surface to form a single structure selected from the group consisting of a Euclidean plane and a non-Euclidean plane.

Foodstuff: As used in this disclosure, a foodstuff refers to an edible material that is used as food.

Footing: As used in this disclosure, a footing refers to one of a plurality of small pedestals that combine to: a) raise an object above a supporting surface; and, b) transfer the load path of the object to the supporting surface.

Foraminous: As used in this disclosure, foraminous is an adjective that describes a surface, plate, or platform that is perforated with a plurality of apertures.

Form Factor: As used in this disclosure, the term form factor refers to the size and shape of an object.

Funnel: As used in this disclosure, a funnel is a truncated pyramidal segment shaped object with: 1) openings at the apex and base of the frustum of the truncated pyramid shape of the funnel.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring-loaded hinge is deformed under a rotating force such that the elastic structure returns the spring-loaded hinge back to its relaxed shape after the rotating force is removed from the spring-loaded hinge.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Motor: As used in this disclosure, a motor refers to the method of transferring energy from an external power source into rotational mechanical energy.

N-gon: As used in this disclosure, an N-gon is a regular polygon with N sides wherein N is a positive integer number greater than 2.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Prism: As used in this disclosure, a non-Euclidean prism is a prism structure wherein the center axis of the prism lies on a non-Euclidean plane or is otherwise formed with a curvature.

Offset Lateral Prism Structure: As used in this disclosure, an offset lateral prism structure refers to the juxtaposition of a first lateral face of a first prism structure to a second lateral face of a second prism structure in the manner of a lateral prism structure except that one or more of the following conditions need not be true: a) the center axes of the first prism and the second prism are no longer parallel; and, b) the congruent ends of the first prism are no longer parallel to the congruent ends of the second prism.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Paddle: As used in this disclosure, a paddle is a handheld tool that comprises a handle and a blade. The blade attaches to the handle. The blade is the working element of the paddle. The blade is a broad and roughly disk-shaped structure used to displace a liquid or a bulk solid. The paddle is often used to propel a vessel through the water.

Pedestal: As used in this disclosure, a pedestal is an intermediary load bearing structure that that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. The center axis of a pyramid is the line drawn from the vertex where the N faces meet to the center of the N-gon base. The center axis of a right pyramid is perpendicular to the N-gon base. Pyramids can be further formed with circular or elliptical bases which are commonly referred to as a cone or an elliptical pyramid respectively. A pyramid is defined with a base, an apex, and a lateral face. The base is the N-gon shaped base described above. The apex is the vertex that defines the center axis. The lateral face is formed from the N triangular faces described above.

Radial: As used in this disclosure, the term radial refers to a direction that: 1) is perpendicular to an identified central axis; or, 2) projects away from a center point.

Rotation: As used in this disclosure, rotation refers to the cyclic movement of an object around a fixed point or fixed axis. The verb of rotation is to rotate.

Semi-Enclosed Prism: As used in this disclosure, a semi-enclosed prism is a prism-shaped structure wherein a portion of the lateral face of the prism-shaped is removed or otherwise replaced with a negative space.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Timing Device: As used in this disclosure, the timing device is a device configured for use in measuring the passage of time. The timing device is often called a timer.

Truncated: As used in this disclosure, a geometric object is truncated when an apex, vertex, or end is cut off by a line or plane.

Truncated Pyramid: As used in this disclosure, a truncated pyramid is a frustum that remains when the apex of a pyramid is truncated by a plane that is parallel to the base of the pyramid.

Tube: As used in this disclosure, a tube is a hollow prism-shaped device formed with two open ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A food breading device comprising
a containment shell, a paddle structure, and a timing device;
wherein the timing device attaches to the containment shell;
wherein the paddle structure mounts in the containment shell;
wherein the food breading device is configured for use with a target foodstuff and a coating foodstuff;
wherein the food breading device coats the coating foodstuff on the target foodstuff;
wherein the containment shell comprises the prism structure, a pedestal structure, and a funnel;
wherein the pedestal structure attaches to the prism structure;
wherein the funnel attaches to the prism structure;
wherein the paddle structure comprises a foraminous tube, a plurality of radial hooks, and a drive shaft;
wherein the plurality of radial hooks attach to the foraminous tube;
wherein the drive shaft attaches to the foraminous tube such that the foraminous tube and the drive shaft form the prism structure.

2. The food breading device according to claim 1
wherein the coating foodstuff has a bulk solid phase;
wherein the paddle structure is a rotating structure;
wherein the paddle structure rotates such that the paddle structure changes the position of the target foodstuff within the containment shell;
wherein the rotation of the paddle structure further releases the coating foodstuff onto the target foodstuff.

3. The food breading device according to claim 2 wherein the timing device is a countdown timer that generates an alarm after a previously determined amount of time has elapsed.

4. The food breading device according to claim 3
wherein the containment shell is a hollow structure.

5. The food breading device according to claim 4
wherein the paddle structure is a hollow structure.

6. The food breading device according to claim 5
wherein the paddle structure is configured to be mounted within the containment shell such that the paddle structure rotates within the containment shell;
wherein an axis of rotation of the paddle structure aligns with a center axis of the prism structure formed by the mounting of the paddle structure in the containment shell;
wherein the rotation of the paddle structure moves the target foodstuff within the containment shell;
wherein the paddle structure further distributes the coating foodstuff onto the target foodstuff.

7. The food breading device according to claim 6
wherein the prism structure further comprises a first congruent end, a second congruent end, and a first lateral face;
wherein the second congruent end is a congruent end of the prism-shaped structure formed by the prism structure;
wherein the second congruent end is the congruent end of the prism structure that is distal from the first congruent end.

8. The food breading device according to claim 7
wherein the prism structure further comprises a door and a door aperture;
wherein the door aperture is an aperture formed through the first lateral face that forms a semi-enclosed structure of the prism structure;
wherein the door is an access barrier that provides access into an interior containment space formed by the prism structure.

9. The food breading device according to claim 8
wherein the door aperture forms the port that provides access to a hollow interior of the prism structure;
wherein the door is a rotating structure;
wherein the door rotates between a closed position and an open position;
wherein the door controls access into the interior containment space of the prism structure;
wherein a curvature of the door is selected such that the door sits flush on the exterior surface of the first lateral face of the prism structure;
wherein the span of the length of the perimeter of the door is greater than the span of the length of the perimeter of the door aperture such that the door encloses the door aperture;
wherein the door further comprises a hinge structure;
wherein the hinge structure attaches the door to the first lateral face of the prism structure such that the door encloses the door aperture;
wherein the hinge structure attaches the door to the prism structure such that the door rotates relative to the first lateral face of the prism structure.

10. The food breading device according to claim 9
wherein the pedestal structure forms a load path that transfers the load of the food breading device to a supporting surface;
wherein the pedestal structure elevates the prism structure above the supporting surface.

11. The food breading device according to claim 10
wherein the pedestal structure mounts on the exterior surface of the prism structure;
wherein the pedestal structure comprises a plurality of footings;
wherein each of the plurality of footings is a disk structure;
wherein each of the plurality of footings forms a portion of a load path that transfers the load of the food breading device to the supporting surface;

wherein each of the plurality of footings attaches to the first lateral face of the prism structure to forms an offset lateral prism structure;

wherein the plurality of footings combine to form the pedestal structure that elevates the prism structure above the supporting surface.

12. The food breading device according to claim 11
wherein the funnel has a hollow pyramid shape;
wherein the funnel is formed as a truncated pyramid;
wherein the funnel mounts in the first congruent end of the prism structure;
wherein the funnel transports the coating foodstuff from the exterior of the prism structure into the paddle structure.

13. The food breading device according to claim 12
wherein the foraminous tube is a hollow structure;
wherein the foraminous tube has a capped tube structure.

14. The food breading device according to claim 13
wherein the foraminous tube comprises a third congruent end, a fourth congruent end, and a second lateral face;
wherein the third congruent end is the open end of the capped tube structure of the foraminous tube;
wherein the third congruent end forms a fluidic connection with the funnel of the prism structure such that the target foodstuff flows into the foraminous tube through the third congruent end;
wherein the third congruent end attaches to the first congruent end of the prism structure such that the foraminous tube rotates freely within the prism structure;
wherein the fourth congruent end is the closed end of the capped tube structure of the foraminous tube;
wherein the fourth congruent end is the congruent end of the foraminous tube that is distal from the third congruent end;
wherein the fourth congruent end attaches to the second congruent end of the prism structure such that the foraminous tube rotates freely within the prism structure;
wherein a drive shaft inserts through the fourth congruent end of the prism structure;
wherein the fourth congruent end attaches to the second congruent end of the prism structure such that the foraminous tube rotates freely within the prism structure;
wherein the second lateral face is the lateral face of the prism structure of the foraminous tube;
wherein the foraminous tube attaches to the first congruent end and the second congruent end of the prism structure such that the foraminous tube rotates freely within the prism structure;
wherein the second lateral face is a foraminous structure;
wherein the coating foodstuff falls through the foraminous structure of the second lateral face of the foraminous tube to coat the target foodstuff
each of the plurality of radial hooks is a mixing structure;
wherein each of the plurality of radial hooks attaches to the foraminous tube such that the rotation of the foraminous tube rotates the plurality of radial hooks through the target foodstuff;
wherein the mixing structure of each of the plurality of radial hooks pushes the target foodstuff to a different position within the prism structure as the plurality of radial hooks rotates within the prism structure.

15. The food breading device according to claim 14
wherein the timing device mounts on the first congruent end of the prism structure;
wherein the timing device indicates when the paddle structure should stop rotating within the containment shell.

16. The food breading device according to claim 15
wherein the drive shaft is manually driven;
wherein the drive shaft is a handle;
wherein the handle is a crank;
wherein the handle forms a grip that can be manually rotated around the axis of rotation of the drive shaft such that the rotation of the drive shaft rotates the foraminous tube and the plurality of radial hooks within the prism structure;
wherein the timing device generates the alarm indicating that the paddle structure should no longer continue rotating within the containment shell.

17. The food breading device according to claim 15
wherein the drive shaft is mechanically driven;
wherein the drive shaft is an electric motor;
wherein the electric motor is an electric device;
wherein the electric motor converts electrical energy into rotational mechanical energy;
wherein the electric motor rotates the shaft such that the rotation of the drive shaft rotates the foraminous tube and the plurality of radial hooks within the prism structure;
wherein the timing device generates an electric signal that discontinues the operation of the electric motor.

* * * * *